May 23, 1939.  A. J. OLSON  2,159,448
AGRICULTURAL IMPLEMENT
Filed June 14, 1937  2 Sheets-Sheet 1
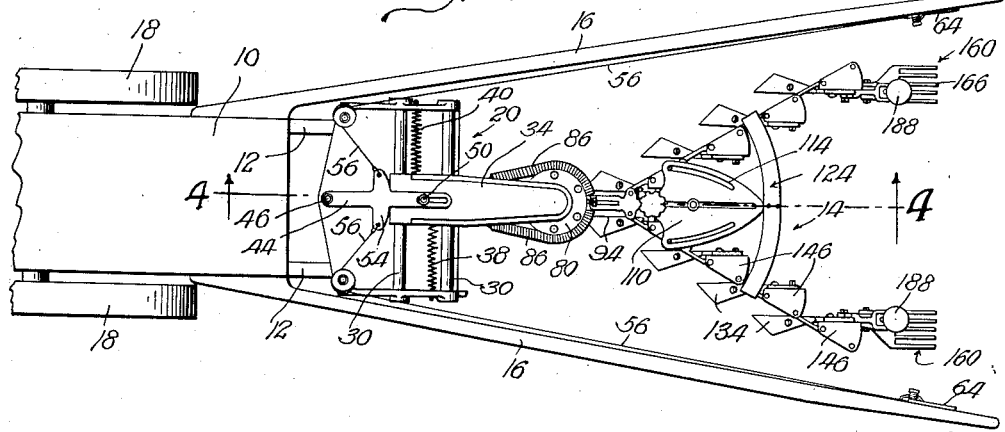
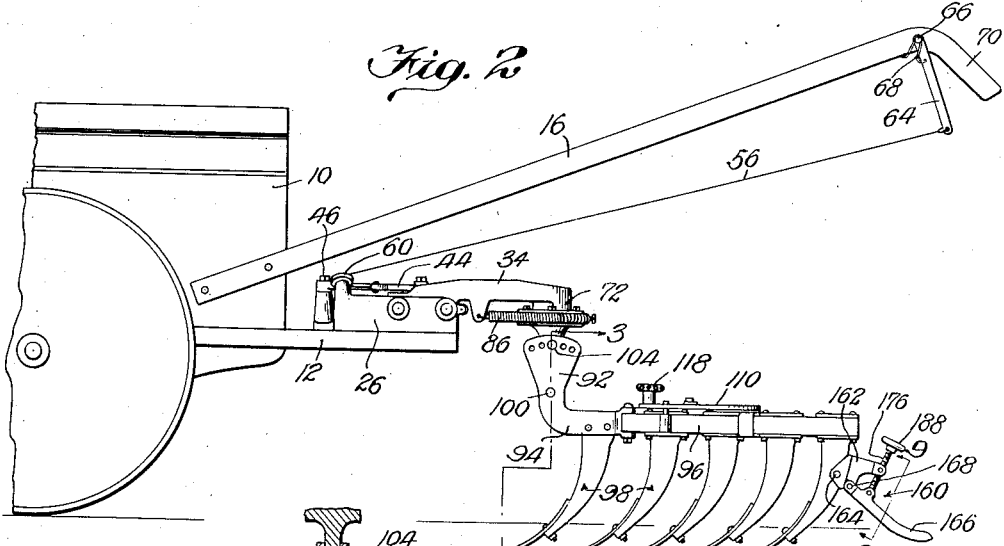
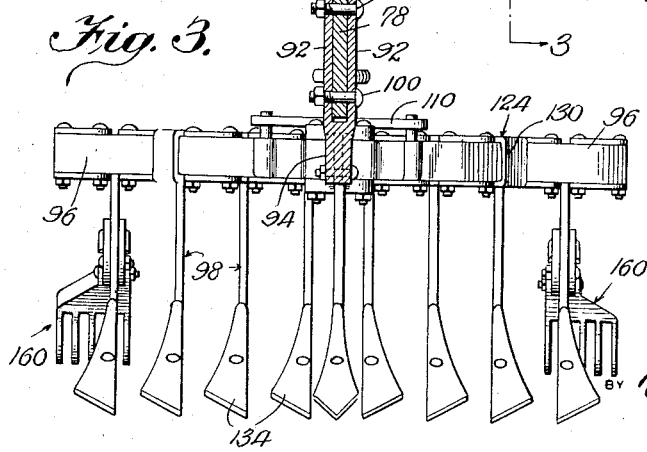
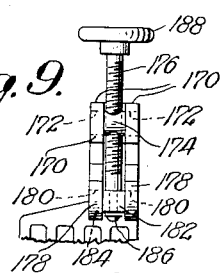
Albert J. Olson
INVENTOR
By Victor J. Evans & Co.
HIS ATTORNEYS May 23, 1939.   A. J. OLSON   2,159,448
AGRICULTURAL IMPLEMENT
Filed June 14, 1937   2 Sheets-Sheet 2
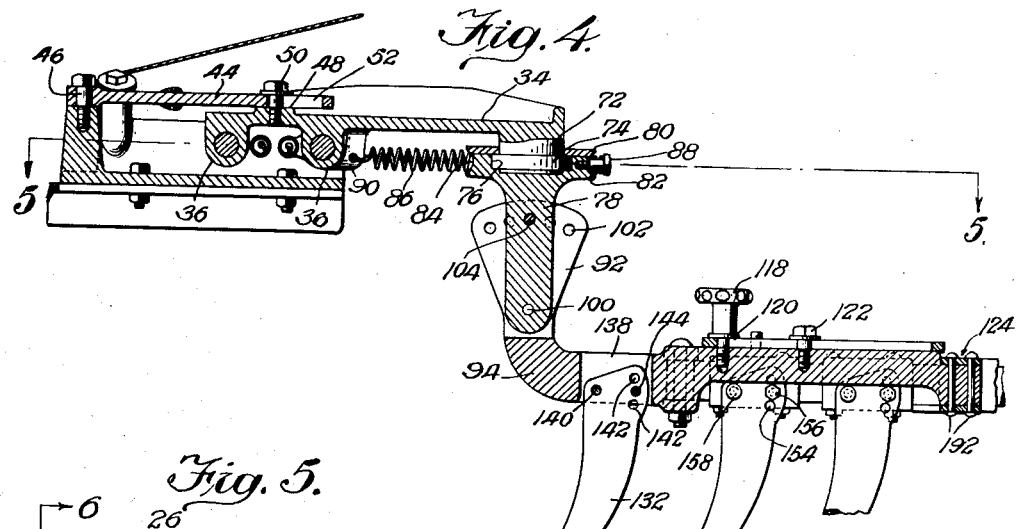
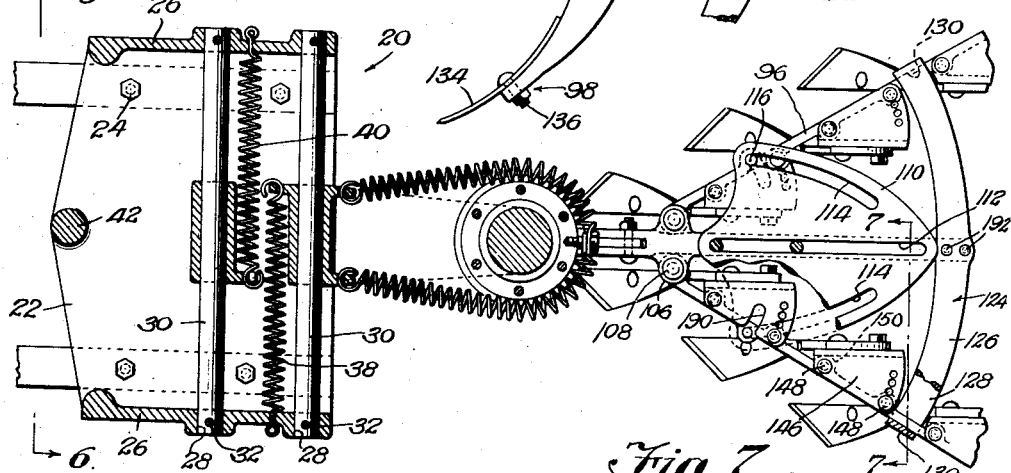
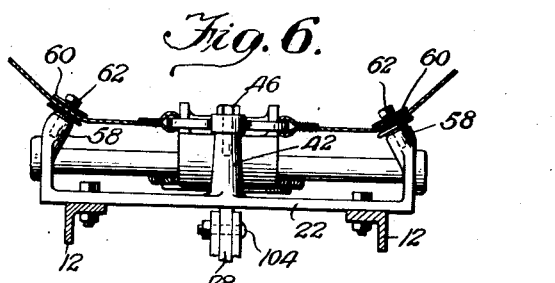
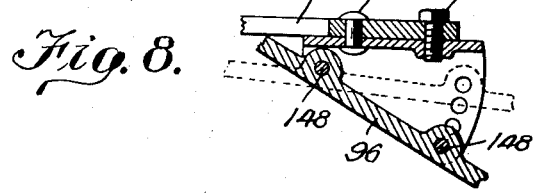
Albert J. Olson,
INVENTOR
BY Victor J. Evans & Co.
HIS ATTORNEYS Patented May 23, 1939

2,159,448

UNITED STATES PATENT OFFICE 2,159,448

AGRICULTURAL IMPLEMENT

Albert J. Olson, Niles, Ill.

Application June 14, 1937, Serial No. 148,202

3 Claims. (Cl. 97—48)

My invention relates to agricultural implements and includes among its objects and advantages the provision of an improved garden cultivator.

In the accompanyng drawings:

Fig. 1 is a top plan view of my invention showing it attached to a small tractor;

Fig. 2 is a side elevation;

Fig. 3 is a sectional view along the line 3—3 of Fig. 2;

Fig. 4 is an enlarged sectional view along the line 4—4 of Fig. 1;

Fig. 5 is a sectional view along the line 5—5 of Fig. 4;

Fig. 6 is a view taken from the position indicated by line 6—6 of Fig. 5;

Fig. 7 is a sectional view along the line 7—7 of Fig. 5;

Fig. 8 is a sectional view along the line 8—8 of Fig. 7; and

Fig. 9 is an enlarged detail view of one of the depth limiting skids taken from the position indicated by line 9—9 of Fig. 2.

In the embodiment selected to illustrate my invention I make use of a tractor 10 which may be of anyone of the many types now employed for pulling garden cultivators. In Figs. 1 and 2, I illustrate the tractor as being provided with two beams 12 which constitute a drawbar for the cultivator 14. Handles 16 are fixedly connected with the tractor 10 for steering purposes, and the tractor includes the usual traction wheels 18. The specific construction of the tractor as well as controls therefor are well known in the art and need not be described in further detail.

Specifically, my garden cultivator comprises a head 20 mounted on the beams 12 and to which the cultivator 14 is operatively connected. Head 20 comprises a plate 22 bolted to the beams 12 by bolts 24. The plate includes two side walls 26 provided with openings 28 for supporting the ends of shafts or bars 30 having their ends positioned within the openings 28 and fixedly connected with the sides 26 by key pins 32.

In Figs. 1 and 4, I illustrate a coupling member 34 which is slidably connected with the bars 30 and to which the cultivator 14 is pivotally connected for movement about a vertical axis. Coupling member 34 includes two bored projections 36 which loosely receive the bars 30. The bars are arranged in parallel relation so as to guide the coupling member 34 as it moves laterally of the plate 22. In Fig. 5, I illustrate a tension spring 38 as having one end connected with one of the walls 26 and one of the extensions 36 while a tension spring 40 connects the other extension 36 with the opposite wall 26. With the springs arranged according to Fig. 5, their opposing tension normally maintains the coupling member 34 centrally of the plate 22, as illustrated in Fig. 1.

Means is provided for manually shifting the coupling element 34 longitudinally of the rods 30. Plate 22 carries a post 42 upon which a lever 44 is pivotally mounted. One end of the lever includes an opening for loosely receiving a bolt 46 threaded into the post 42. Coupling member 34 is provided with a raised surface 48 upon which the lever 44 rests, and a bolt 50 is threaded into the coupling member 34 centrally of the raised surface 48 for operatively connecting the lever 44 with the coupling member. The lever is slotted at 52 for loosely receiving the bolt 50, which slot is of sufficient length to permit the lever 44 to be pivoted about the axis of the bolt 46.

Referring to Fig. 1, the lever 44 is provided with lateral extensions 54 to which pull wires or cables 56 are connected. Fig. 6 illustrates the walls 26 as being provided with bosses 58 upon which grooved sheaves 60 are rotatably mounted through the medium of bolts 62 having threaded relation with the bosses only. Cables 56 extend along the handles 16 and are connected with levers 64 at their lower ends, as illustrated in Fig. 2. Each lever is pivotally connected at 66 with its respective handle 16 and includes a spring 68 of sufficient stiffness to take up slack in its cable. Levers 16 are arranged in close relation with the grips 70 to be easily accessible.

The cultivator 14 normally assumes the position of Fig. 1 with respect to the tractor, but in cases where the tractor might run closer to one row than the other, the cultivator may be shifted laterally of the tractor through manipulation of the levers 64. If the lever 64 associated with the upper handle when viewing Fig. 1 is shifted, the pull on the cable 56 associated therewith causes the lever 44 to pivot upwardly, which shifts the cultivator 14 to the right with respect to the path of travel of the tractor. Similarly, a pull on the other lever 64 will shift the cultivator to the left. Springs 38 and 40 will immediately return the cultivator to the position of Fig. 1 upon release of either of the levers 64. Thus, it will be seen that the cultivator 14 may be shifted for maintaining proper relation with the rows on either side if the tractor should take an offside position.

It is advisable to provide a pivotal connection between the cultivator and the connecting bar 34. To this end the coupling bar 34 is provided with a depending shaft 72 (see Fig. 4) which terminates in a flange 74 rotatably housed within a groove 76 in a vertical bar 78. A washer 80 encircles the shaft 72 and is bolted to the flange 82 at the upper end of the bar 78 for rotatably connecting the shaft 72 with the bar. Flange 82 includes a peripheral groove 84 which provides a track for tension wires 86. One end of each wire 86 is connected with a bolt 88 having threaded relation with the flange 82, and the opposite ends of the wires are connected with lugs 90 depending from the coupling member 34. Wires 86 are of equal tension and tend to maintain the cultivator 14 in the position of Fig. 1. However, the cultivator may pivot about the shaft 72 as an axis, but pivotal movement in either direction will increase the tension of one spring. Thus, the cultivator 14 may be shifted laterally by pivoting the tractor 10 about a vertical axis through the medium of the handles 16 for acurately guiding the cultivator with respect to the rows on either side. Because of the pivotal connection between the cultivator and the tractor, the tractor may be easily turned about a vertical axis without removing the cultivator from the soil. Immediately after shifting the cultivator laterally about the axis of the shaft 72, the springs 86 will again position the cultivator according to Fig. 1.

Bar 78 is positioned between two plates 92 formed integrally with a beam 94 to which the wings or bars 96 which carry the cultivating tools 98 are connected. The lower end of the bar 78 is pivotally connected at 100 between the plates 92, and the plates are provided with aligned openings 102 for selectively receiving the bolt 104 which connects the bar 78 as a unit with the plates 92. By shifting the bolt 104 to different aligned openings 102, the cultivator may be adjusted for depth and proper alignment with respect to the ground surface.

Beam 30 includes two spaced lugs 106 on each side between which the forward ends of the bars 96 are pivotally connected by means of bolts 108. Bars 96 are pivoted about the axes of the bolts 108 for changing the angularity between the bars to accommodate different spacings between the rows being cultivated. Means is provided for securely fastening the bars 96 in various adjusted positions. Upon the beams 94 I mount a plate 110 (see Figs. 4 and 5). This plate includes a slot 112 paralleling the beam 94 and is provided with two slightly curved slots 114 arranged at acute angles to the beam but reversely of the angularity between the bars 96 and the beam. Each bar 96 includes a pin 116 loosely positioned within its respective slot 114. In reference to Fig. 5, it will be noted that if the plate 110 is pushed forwardly of the beam 94, the slots 114 co-act on the pins 116 for bringing the bars 96 closer together. Fig. 5 illustrates maximum separation between the bars 96, but the slots 114 are of sufficient length to bring the bars 96 substantially into parallel relation. Thus, a large range of adjustment is attained for the bars so as to adapt the cultivator to various conditions of service.

A hand screw 118 has threaded relation with the beam 94 (see Fig. 4) and includes a shoulder 120 arranged to press the plate 110 against the beam 94 to prevent relative movement therebetween. A second bolt 122 extends through the slot 112 and has threaded relation with the beam 94. This bolt constitutes a guide only for the plate 110 to prevent pivotal movement of the plate about the axis of the hand bolt 118. The plate 110 may be easily and quickly adjusted by merely unloosening the bolt 118 and pushing the plate forwardly or rearwardly and then tightening the bolt. Fixedly connected with the rear end of the beam 94 is a supporting loop 124 for the bars 96. This loop comprises upper and lower reaches 126 and 128, respectively, between which the bars 96 move freely, and the reaches 126 and 128 are integrally connected by end reaches 130. Loop 124 cooperates with the lugs 106 and the bolts 108 for supporting the bars 96 while the reaches 126 and 128 perform a supporting function in all positions of the bars 96.

Each tool 98 comprises a shank 132, to the lower end of which a cultivating shoe 134 is attached as by means of a bolt 136. The shoes 134 may take the size and configuration of any one of many conventional shoes. The leading tool 98 has the upper end of its shank 132 positioned within a slot 138 in the pin 94. The shank 132 is pivotally connected with the beam 94 by a bolt 140 and is provided with a plurality of openings 142 for the reception of a bolt 144 which passes through the beam. Thus, the shank 132 may be adjusted to various angular positions by shifting the bolt 144 to the desired opening 142 in the shank.

The remaining shanks 132 are also pivotally connected for adjustment in the manner of the leading shank 132, but the remaining shanks are connected with supporting brackets 146 attached to the bars 96. Figs. 5, 7, and 8 best illustrate the specific construction of the brackets 146. All the brackets are identical in construction so that the description of one will refer to all. Fig. 7 illustrates the bracket 146 as being U-shaped with the shank 132 attached to the bight of the bracket. The legs of the bracket pass over the upper and lower edges of the bar 96 and are firmly secured thereto by two bolts 148 (see Figs. 5 and 7). The bars 96 are provided with additional material at 150 for supporting the bolts 148.

Referring again to Fig. 5, the rear ends of the brackets 146 are provided with a plurality of openings 152 for selective reception of the rear bolt 144 associated with the individual bracket. Thus, each bracket may be pivoted about its forward bolt 148 as an axis to vary the angularity of the tool 98 associated with that bracket. Fig. 8 illustrates the manner in which the shanks 132, with the exception of the forward shank, are pivotally connected with the brackets 146 for pivotal movement in the same manner as the forward shank 132. In Fig. 4, I illustrate the remaining shanks 132 as being provided with a plurality of holes 154 corresponding to the holes 142 for the reception of bolts 156. The brackets 146 carry rivets 158 (see Fig. 8) for pivotally connecting the shanks therewith. It will thus be seen that all the shanks 132 may be adjusted in the same manner.

To the rear shanks 132 I connect skids 160 which support the load of the rear end of the cultivator 14 and act as guides for limiting the depth of cut. In Figs. 1, 2, and 3, I illustrate the specific construction of the skids 160. Each of the two rear shanks 132 is provided with a bracket 162 which is bolted at 164 to its respective shank. In Fig. 2, the forked member 166 is pivotally connected at 168 to its respective bracket 162. Bracket 162 includes two spaced lugs 170 bored at 172 for rotatably supporting a shaft 174 having threaded relation with a screw 176. The forked member 166 includes two spaced lugs 178 provided with bores 180 for rotatably supporting a shaft 182. This shaft is bored for loosely receiving the reduced shank 184 on the lower end of the screw 176, which shank is upset at 186 to prevent withdrawal of the shank, but the construction is such as to permit the screw to be rotated through the medium of hand wheel 188. Thus, the outer end of the forked member 166 may be raised or lowered about its axis 168 for limiting the cultivating depth of the tools 98.

While the cultivator 14 is connected with the tractor 10 for pivotal movement about a vertical axis, the cultivator is incapable of pivotal action about a horizontal axis. Thus, in lifting the handles 16 upwardly at their outer ends, the cultivator may be lifted clear of the ground. To vary the depth of cut of the cultivator, the beam 94 is adjusted about the axis of the bolt 100 and the skids 160 adjusted accordingly. If the beam 94 were maintained at an angle of 90° to the axis of the shaft 72, as illustrated in Fig. 2, lowering of the handles 16 would cause the cultivator to cut considerably deeper at its rear end than at its forward end. To cut deeper uniformly throughout the full length of the cultivator, it is necessary that the beam 94 be adjusted about the axis of the bolt 100 so as to define an acute angle to the axis of the shaft 72. If a shallower cut is desired, the beam is adjusted to define an obtuse angle with respect to the axis of the shaft 72.

All the tools 98 are adjustably mounted for pivotal movement about horizontal axes while all the tools in the rear of the leading tool are additionally mounted for pivotal movement about vertical axes. Thus, the tools may be adjusted about their horizontal axes for accommodating the tools to different soil conditions and angular relation with respect to the soil being cultivated. Adjustment of the tools about a vertical axis permits precise adjustment for accommodating different angular relations between the bars 96.

Fig. 5 illustrates the two brackets 146 immediately in the rear of the forward tool 98 as being provided with slots 190 for accommodating the pins 116. Thus, these two brackets may be pivoted outwardly with respect to the bars 96 without interference from the pins 116. The plate 110 is supported by the beam 94 in spaced relation with the bars 96 so as to accommodate the brackets 146 and the bolts 148 which project above the brackets. The loop 124 is fixedly connected with the beam 94 by bolts or rivets 192 (see Figs. 4 and 5).

Without further elaboration, the foregoing will so fully explain my invention that others may, by applying current knowledge, readily adapt the same for use under various conditions of service.

I claim:

1. An agricultural implement comprising a beam, bars adjustably connected with said beam, a plurality of soil engaging tools adjustably connected with each of said bars, said soil engaging tools being adjustable about horizontal and vertical axes, and a loop fixedly connected with said beam and encircling the bars for supporting the same.

2. The combination with a tractor, of a head attached to the tractor and having guide means extending transversely of the tractor, a cultivator including a beam, a coupling member slidable on said guide means, a vertical pivotal connection between the coupling member and said beam, resilient means co-operable on said coupling member and the head for yieldingly supporting the former in a normal position, and manually actuated means operatively connected with said coupling member for shifting the same in either direction from its normal position along said guide means.

3. The combination with a tractor, of a head attached to the tractor and having guide means extending transversely of the tractor, a cultivator including a beam, a coupling member slidable on said guide means, a vertical pivotal connection between the coupling member and said beam, resilient means co-operable on said coupling member and the head for yieldingly supporting the former in a normal position, manually actuated means operatively connected with said coupling member for shifting the same in either direction from its normal position along said guide means, and resilient means co-operable on said coupling member and a portion of said vertical pivotal connection for yieldingly restraining the cultivator from lateral displacement about the axis of the vertical pivotal connection.

ALBERT J. OLSON.